(12) United States Patent
Bodary et al.

(10) Patent No.: US 11,396,976 B1
(45) Date of Patent: Jul. 26, 2022

(54) AXLE ASSEMBLY HAVING A DIPSTICK ASSEMBLY

(71) Applicant: ArvinMeritor Technology, LLC, Troy, MI (US)

(72) Inventors: Andrew Bodary, Troy, MI (US); Mailys Eichsteadt, Troy, MI (US); Ginger St. Cyr, Troy, MI (US); Florin Patrascu, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/197,464

(22) Filed: Mar. 10, 2021

(51) Int. Cl.
*F16N 19/00* (2006.01)
*F16H 57/02* (2012.01)
*F16H 57/04* (2010.01)

(52) U.S. Cl.
CPC .......... *F16N 19/003* (2013.01); *F16H 57/02* (2013.01); *F16H 57/0457* (2013.01); *F16H 57/0483* (2013.01); *F16H 2057/02052* (2013.01)

(58) Field of Classification Search
CPC ........ F16N 19/003; G01F 23/04; F16H 57/02; F16H 57/0457; F16H 57/0483; F16H 2057/02052; B03C 1/28; B03C 1/286; B03C 1/288
See application file for complete search history.

(56) References Cited

U.S. PATENT DOCUMENTS

| | | | | |
|---|---|---|---|---|
| 4,752,759 A | * | 6/1988 | Kazuyuki | B03C 1/286 335/305 |
| 5,588,502 A | * | 12/1996 | Bedi | B03C 1/286 141/98 |
| 5,949,317 A | * | 9/1999 | Fink | F01M 11/03 335/305 |
| 9,200,941 B1 | * | 12/2015 | Kelly | G01F 23/04 |

OTHER PUBLICATIONS

U.S. Appl. No. 16/659,919, filed Oct. 22, 2019; 22 Pages.

* cited by examiner

*Primary Examiner* — Thomas C Diaz
(74) *Attorney, Agent, or Firm* — Brooks Kushman PC

(57) ABSTRACT

An axle assembly that includes a housing assembly and a dipstick assembly. The housing assembly may at least partially define a cavity that receives a lubricant. At least a portion of the dipstick assembly may be removably mountable to the housing assembly and may include a fitting and a dipstick.

19 Claims, 14 Drawing Sheets

AXLE ASSEMBLY HAVING A DIPSTICK ASSEMBLY

TECHNICAL FIELD

This disclosure relates to an axle assembly that has dipstick assembly. The dipstick assembly may facilitate measurement of a level of lubricant in a housing assembly.

BACKGROUND

An axle assembly having a fill-check assembly is disclosed in U.S. patent application Ser. No. 16/659,919.

SUMMARY

In at least one embodiment an axle assembly is provided. The axle assembly may include a housing assembly and a dipstick assembly. The housing assembly may at least partially define a cavity that receives lubricant. The dipstick assembly may include a fitting, a cap, and a dipstick. The fitting may be mounted to the housing assembly and may define a fitting hole that is disposed along an axis. The cap may be removably mountable to the fitting. The dipstick may include a first end portion, a second end portion, a first intermediate portion, and a second intermediate portion. The first end portion may be mounted to the cap. The second end portion may be disposed opposite the first end portion. The first intermediate portion may extend from the first end portion and may be at least partially received in the fitting hole when the cap is mounted to the fitting. The second intermediate portion may extend from the first intermediate portion to the second end portion. The second intermediate portion may be disposed outside of the fitting hole when the cap is mounted to the fitting. The second intermediate portion may be disposed substantially perpendicular to the axis.

In at least one embodiment an axle assembly is provided. The axle assembly may include a housing assembly and a dipstick assembly. The housing assembly may have a mounting hole and may at least partially define a cavity that receives lubricant. The dipstick assembly may be removably mountable to the housing assembly. The dipstick assembly may include a fitting and a dipstick. The fitting may be removably mountable to the housing assembly, may be receivable in the mounting hole, and may be disposed along an axis. The dipstick may be rotatably mounted to the fitting such that the dipstick is rotatable about the axis independent of the fitting.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
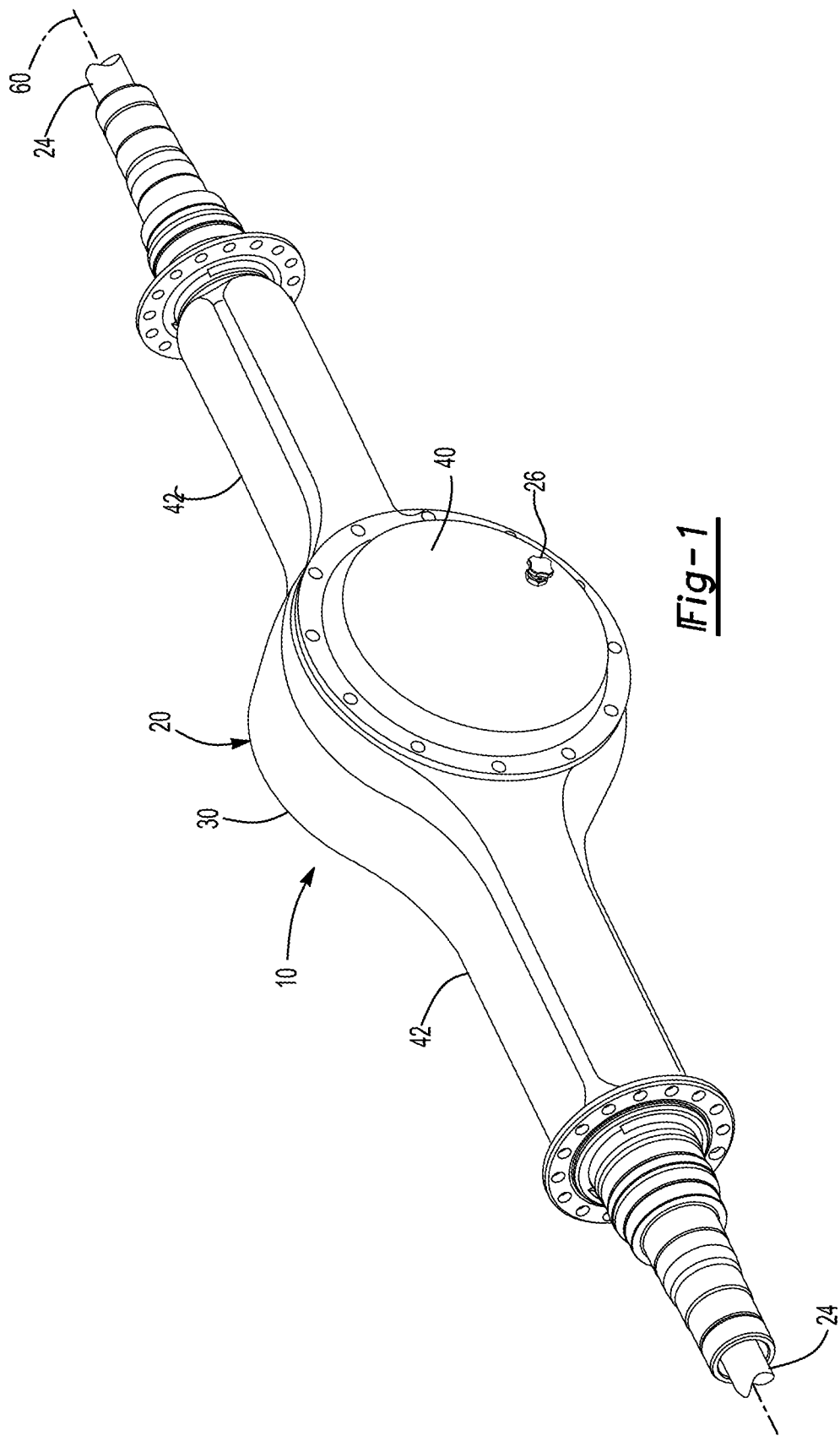
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

One or more axle assemblies may be provided with the vehicle. As is best shown with reference to FIGS. 1 and 2, the axle assembly 10 may include a housing assembly 20, a differential assembly 22, at least one axle shaft 24, and a dipstick assembly 26.

Figure 2:
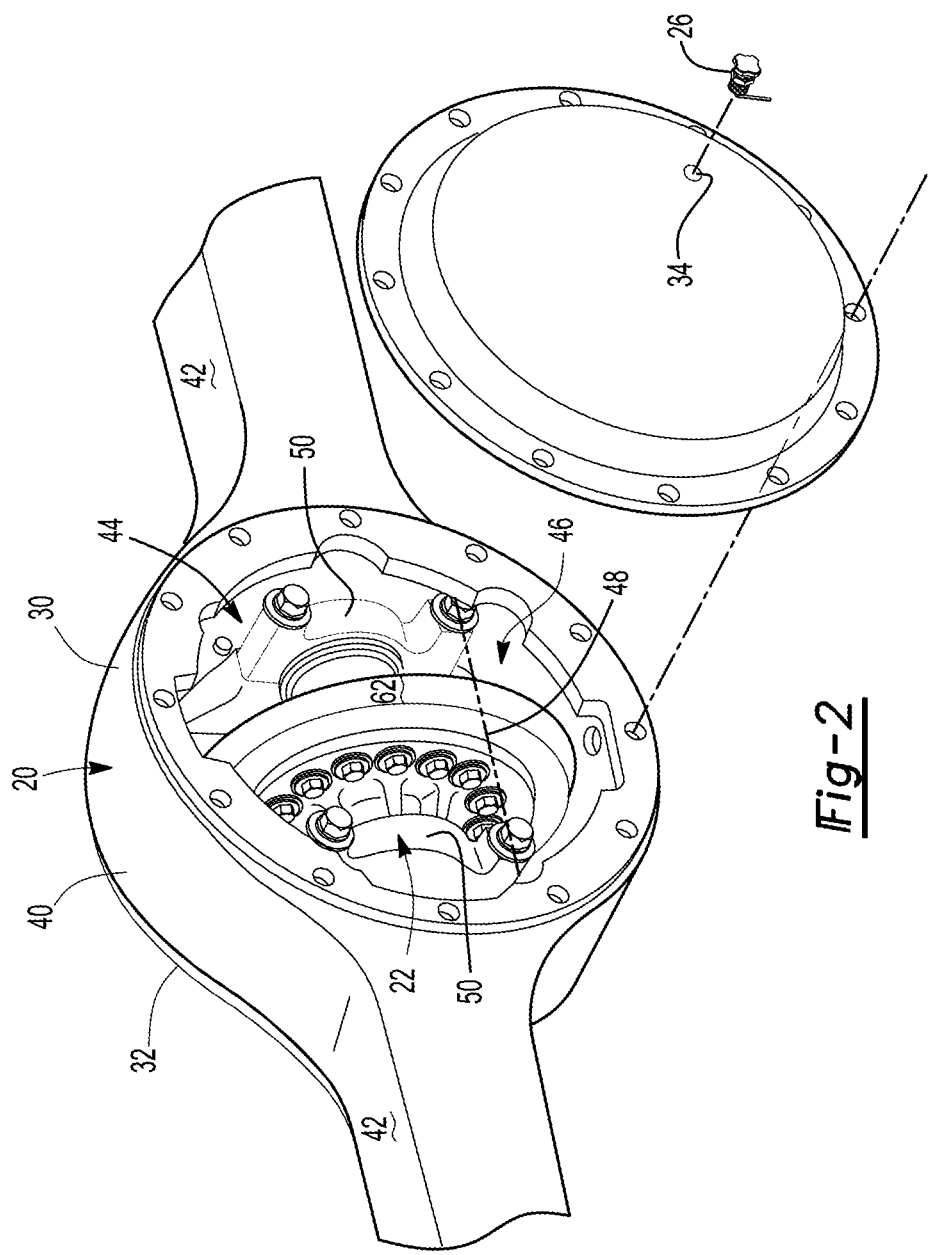
FIG. 2 is an exploded view of a portion of the axle assembly of FIG. 1.

Referring primarily to FIG. 2, the housing assembly 20 may receive various components of the axle assembly 10. In addition, the housing assembly 20 may facilitate mounting of the axle assembly 10 to the vehicle. In at least one configuration, the housing assembly 20 may include an axle housing 30, a differential carrier 32, and a mounting hole 34.

The axle housing 30 may receive and may support the axle shafts 24, which are best shown in FIG. 1. In at least one configuration, the axle housing 30 may include a center portion 40 and at least one arm portion 42.

The center portion 40 may be disposed proximate the center of the axle housing 30. The center portion 40 may at least partially define a cavity 44 that may at least partially receive the differential assembly 22. As is best shown in FIG. 2, a lower region of the center portion 40 and the cavity 44 may at least partially define a sump portion 46 that may contain or collect lubricant 48. The lubricant 48 may be a lubricating fluid such as oil. Lubricant 48 in the sump portion 46 may be splashed by a ring gear of the differential assembly 22 and distributed to lubricate various components when the differential assembly 22 rotates. Lubricant 48 may collect in the sump portion 46 and increase the level of lubricant 48 in the sump portion 46 when the differential assembly 22 does not rotate. In FIG. 2, the center portion 40 is illustrated with a bowl cover exploded from the axle housing 30 to better show features inside the axle housing 30; however, it is contemplated that the bowl cover or a portion thereof may be integrally formed with one or more components that make up the axle housing 30 and may not be removable in the manner shown.

The cavity 44 will be primarily described in the context as being the cavity that includes the sump portion 46; however, it is contemplated that the cavity 44 may be provided in different locations, such as in an arm portion 42 of the housing assembly 20 when the arm portion 42 is configured to collect lubricant 48 or function as a lubricant reservoir.

Referring to FIG. 2, the center portion 40 may facilitate mounting of the differential carrier 32 to the axle housing 30. For example, the center portion 40 may have a set of holes that may be aligned with corresponding holes on the differential carrier 32. Each hole may receive a fastener, such as a bolt, that may couple the differential carrier 32 to the axle housing 30.

Referring to FIGS. 1 and 2, one or more arm portions 42 may extend from the center portion 40. For example, two arm portions 42 may extend in opposite directions from the center portion 40 and away from the differential assembly 22. The arm portions 42 may have substantially similar configurations. For example, the arm portions 42 may each have a hollow configuration or tubular configuration that may extend around and may receive a corresponding axle shaft 24 and may help separate or isolate the axle shaft 24 or a portion thereof from the surrounding environment. An arm portion 42 or a portion thereof may or may not be integrally formed with the center portion 40. It is also contemplated that the arm portions 42 may be omitted.

Referring to FIGS. 1 and 2, the differential carrier 32 may be mounted to the center portion 40 of the axle housing 30. The differential carrier 32 may support the differential assembly 22. For example, the differential carrier 32 may include one or more bearing supports 50 that may support a roller bearing assembly that may rotatably support the differential assembly 22.

Referring to FIG. 2, the mounting hole 34 may be a through hole that extends through a wall of the housing assembly 20. The mounting hole 34 may be provided in any suitable location. For instance, the mounting hole 34 may be provided in the axle housing 30, the differential carrier 32, or both. The mounting hole 34 may be positioned above a maximum lubricant fill level of the axle assembly 10 so that the free end of the dipstick of the dipstick assembly 26 may extend downward toward the lubricant 48 and so that lubricant 48 may not drain out of the housing assembly 20 via the mounting hole 34 when the vehicle is positioned upright on a substantially level or substantially horizontal surface.

The differential assembly 22 may be at least partially received in the center portion 40 of the housing assembly 20. The differential assembly 22 may be rotatable about a differential axis 60 and may transmit torque to its associated traction wheel assemblies via the axle shafts 24. The differential assembly 22 may be operatively connected to the axle shafts 24 and may permit the axle shafts 24 to rotate at different rotational speeds in a manner known by those skilled in the art. The differential assembly 22 may have a ring gear 62 that may have teeth the mate or mesh with the teeth of a gear portion of a drive pinion that may be operatively connected to a power source. The ring gear 62 may be fixedly disposed on a differential case of the differential assembly 22 such that the differential case and ring gear 62 may be rotatable together about the differential axis 60. A differential gear set of the differential assembly 22 may transmit torque to the axle shafts 24 in a manner known by those skilled in the art. Accordingly, the differential assembly 22 may receive torque from the drive pinion via the ring gear 62 and transmit torque to the axle shafts 24.

The power source may be of any suitable type. For instance, the power source may be an electrical power source or a non-electrical power source. An example of an electrical power source is an electrical machine like an electric motor. An example of a non-electrical power source is an internal combustion engine. The power source may be configured as an electric motor that is provided with the axle assembly 10; however, it is contemplated that the power source, whether electrical or non-electrical, may not be provided with the axle assembly 10. For instance, the power source may be located remotely from the axle assembly 10 and may be operatively connected to the axle assembly 10 via a linkage like a shaft.

Referring to FIG. 1, the axle shafts 24 may transmit torque from the differential assembly 22 to corresponding wheel hubs and wheels. Two axle shafts 24 may be provided such that each axle shaft 24 extends through a different arm portion 42 of axle housing 30. The axle shafts 24 may extend along and may be rotatable about an axis, such as the differential axis 60. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Figure 3:
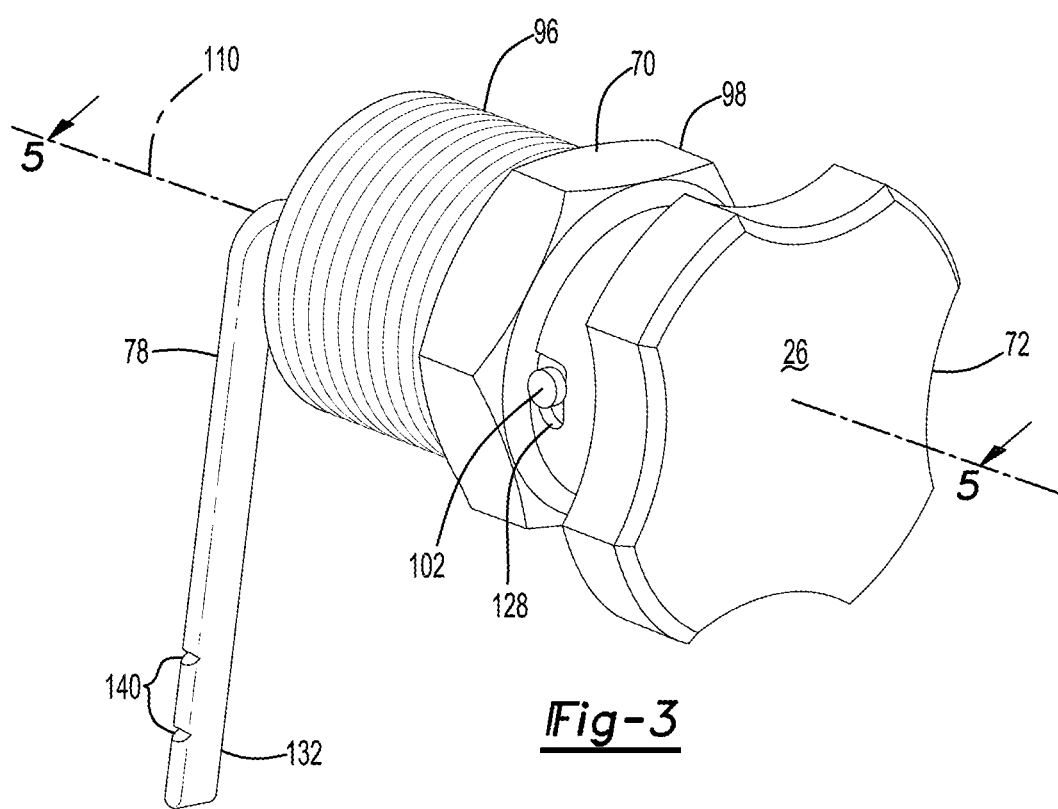
FIG. 3 is a perspective view of a first embodiment of a dipstick assembly that may be provided with the axle assembly.
Figure 4:
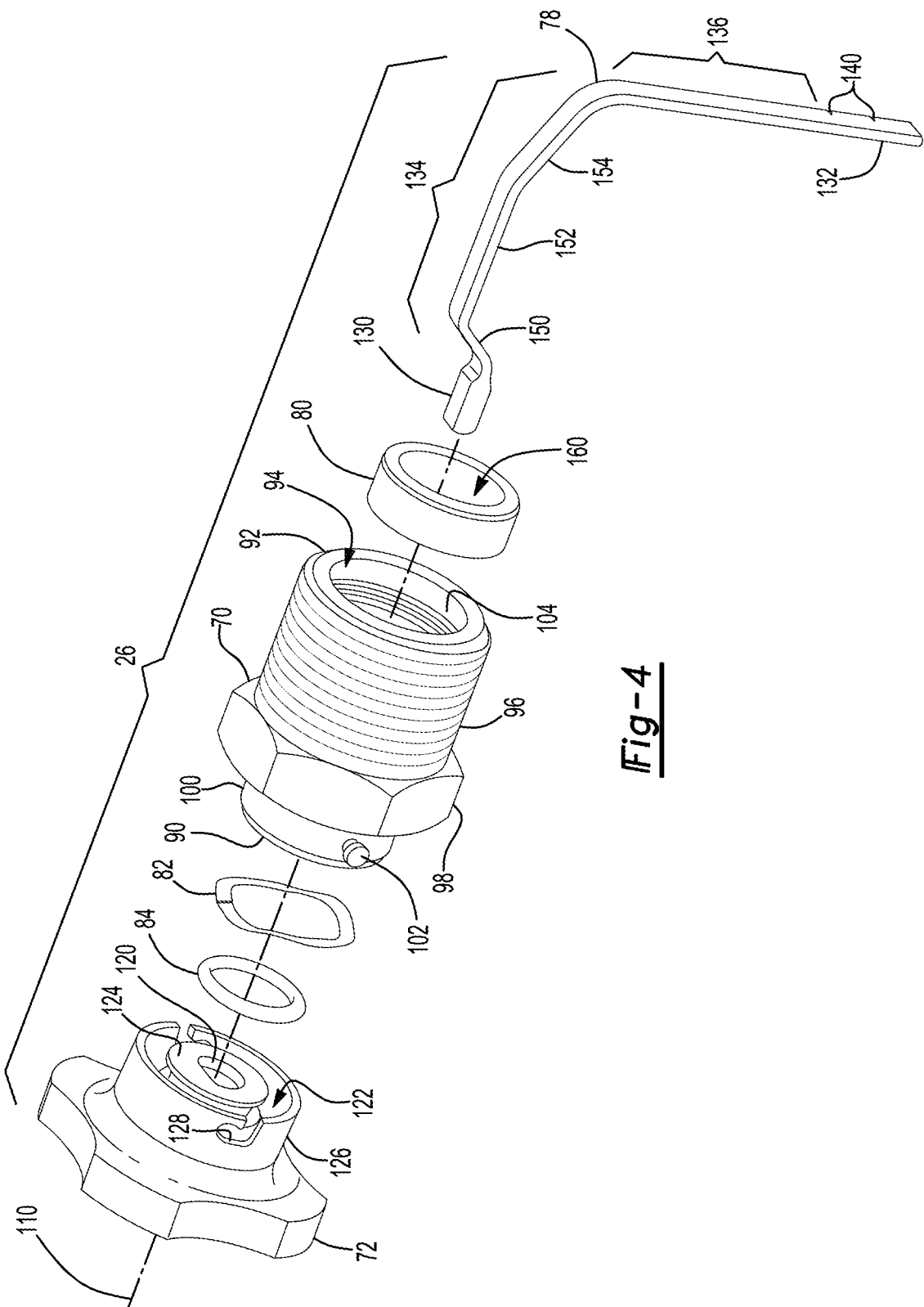
FIG. 4 is an exploded view of the dipstick assembly of FIG. 3.
Figure 5:
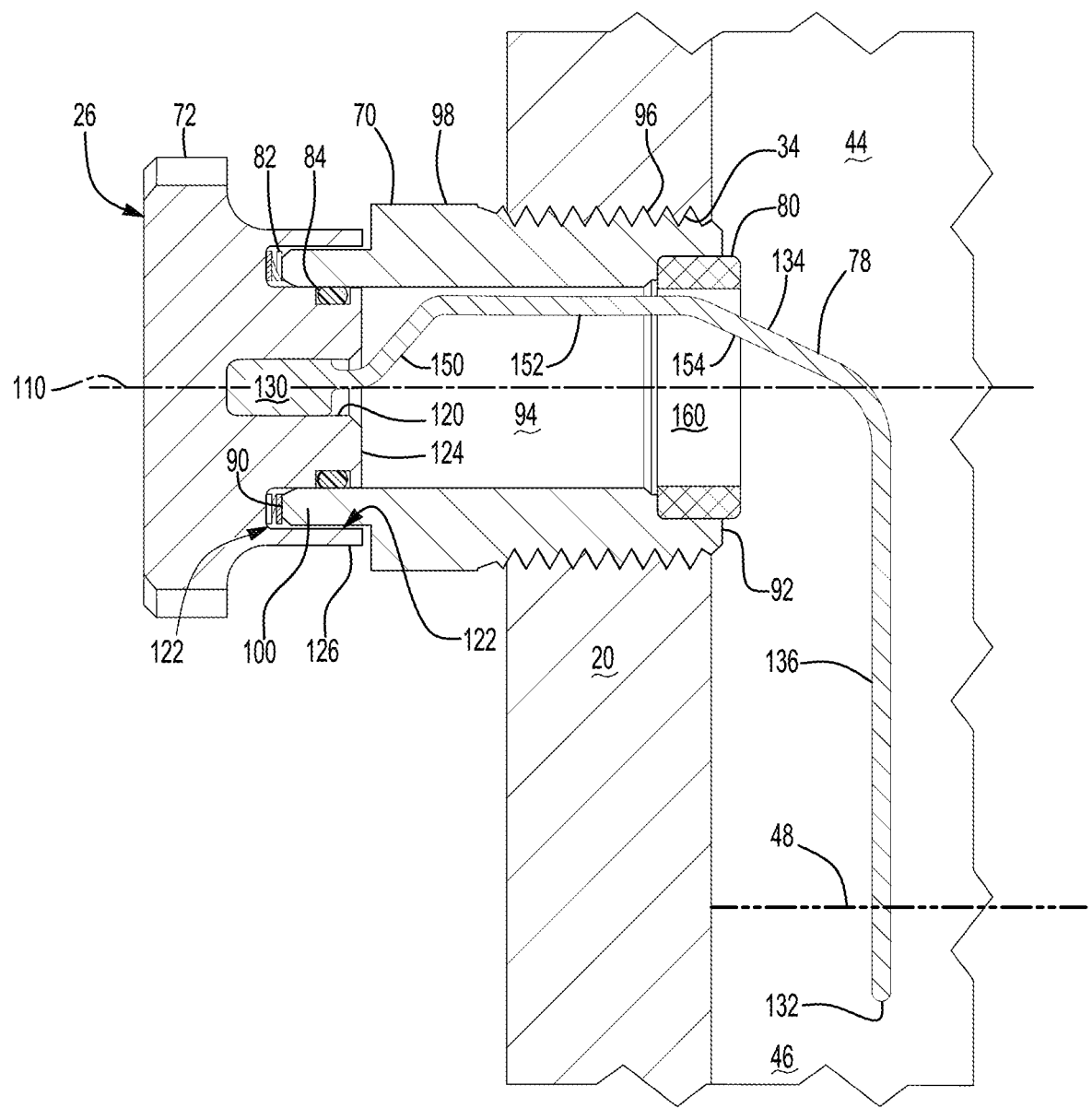
FIG. 5 is a section view along section line 5-5 of the dipstick assembly of FIG. 3 installed on the axle assembly.

Referring to FIGS. 3-5, a first configuration of a dipstick assembly 26 is shown. The dipstick assembly 26 may facilitate inspection of the level of lubricant 48 in a portion of the housing assembly 20, such as the sump portion 46. In at least one configuration, the dipstick assembly 26 may include a fitting 70, a cap 72, and a dipstick 78. The dipstick assembly 26 may also include a magnet 80, a biasing member 82, a seal 84, or combinations thereof.

The fitting 70 may be mounted to the housing assembly 20. For instance, the fitting may be partially received inside the mounting hole 34 of the housing assembly 20. In at least one configuration, the fitting 70 may have a first end 90, a second end 92, a fitting hole 94, a mounting portion 96, and a tool engagement portion 98. The fitting 70 may also include a mounting ring 100, a recess 104, a protrusion 102, or combinations thereof.

Referring primarily to FIGS. 4 and 5, the first end 90 may face away from the housing assembly 20. The first end 90 may also be disposed outside of the housing assembly 20.

The second end 92 may be disposed opposite the first end 90. The second end 92 may be disposed inside the housing assembly 20 or its mounting hole 34.

The fitting hole 94 may be defined by the fitting 70. The fitting hole 94 may be a through hole that may extend from the first end 90 to the second end 92. The fitting hole 94 may extend along an axis 110. In at least one embodiment, the axis 110 may extend in a horizontal or have substantially horizontal direction rather than in a vertical or substantially vertical direction as may be associated with a dipstick for measuring the oil level in an internal combustion engine.

The mounting portion 96 may facilitate mounting of the fitting 70 to the housing assembly 20. In the configuration shown, the mounting portion 96 is threaded and is configured to mate with a corresponding thread in the mounting hole 34. Alternatively, the mounting portion 96 may not be threaded and may be attached to the housing assembly 20 in another manner, including but not limited to an interference fit, or with a weld, adhesive, or the like.

The tool engagement portion 98 may be axially positioned between the first end 90 and the second end 92. For instance, the tool engagement portion 98 may be axially positioned between the mounting portion 96 and the mounting ring 100. The tool engagement portion 98 may be disposed outside of the housing assembly 20. In at least one configuration, the tool engagement portion 98 may include one or more flat surfaces that may be engageable with a tool, such as a socket or a wrench, to facilitate installation of the fitting 70 on the housing assembly 20.

The mounting ring 100 may facilitate mounting of the cap 72. The mounting ring 100 may be disposed outside of the housing assembly 20. The mounting ring 100 may extend in an axial direction from the first end 90 toward the second end 92. In addition, the mounting ring 100 may extend continuously around the axis 110.

Referring to FIG. 4, the protrusion 102 may be disposed outside of the housing assembly 20. As such, the protrusion 102 may be disposed outside of the cavity 44. The protrusion 102 may extend from the mounting ring 100 in a direction that may extend away from the axis 110. The protrusion 102 may have an enlarged head disposed at its distal end.

Referring primarily to FIG. 4, the recess 104 may be configured to receive and position the magnet 80. The recess 104 may extend from the second end 92 toward the first end 90. In addition, the recess 104 may extend radially outward from the fitting hole 94 toward the mounting portion 96 such that the recess 104 may have a larger diameter than the fitting hole 94.

Referring to FIGS. 4 and 5, the cap 72 may be removably mountable to the fitting 70. The cap 72 may be disposed outside of the housing assembly 20 and may facilitate installation and removal of the dipstick 78 as will be described in more detail below. In at least one configuration, the cap 72 may define a mounting feature 120. The cap 72 may also include a groove 122, an inner ring 124, an outer ring 126, a slot 128, or combinations thereof.

The mounting feature 120 may facilitate mounting of the dipstick 78 to the cap 72. The mounting feature 120 may have a male configuration, a female configuration, or combinations thereof. In the configuration shown, the mounting feature 120 has a female configuration and is configured as a blind hole. The mounting feature 120 may be disposed along the axis 110 and may receive an end of the dipstick 78.

The groove 122 may be spaced apart from and may extend around the mounting feature 120. The groove 122 may receive the mounting ring 100 of the fitting 70 when the cap 72 is mounted to the fitting 70. The groove 122 may be defined by the inner ring 124, the outer ring 126, or both.

The inner ring 124 may be radially positioned between the mounting feature 120 and the groove 122. The inner ring 124 may be received inside the fitting hole 94 when the cap 72 is mounted to the fitting 70. In at least one configuration, the inner ring 124 may include a seal groove that may receive the seal 84.

The outer ring 126 may extend around the mounting ring 100 of the fitting 70. In addition, the outer ring 126 may extend around the inner ring 124, if provided, and the axis 110.

Referring to FIGS. 3 and 4, the slot 128 may be configured to receive the protrusion 102 on the fitting 70 to inhibit removal of the cap 72. The slot 128 may extend through the outer ring 126 and may have a generally L-shaped configuration that may extend from an open end to a closed end. The open end may face toward the fitting 70. The slot 128 may extend axially from the open end in a direction that extends away from the fitting 70 to a bend. The slot 128 may change direction at the bend and may extend in a circumferential direction around the outer ring 126 to the closed end. The protrusion 102 and the slot 128 may cooperate to secure the cap. For instance, the cap 72 and the fitting 70 may be axially aligned such that the inner ring 124 may be axially insertable into the fitting hole 94. In addition, the cap 72 and the fitting 70 may be rotationally aligned about the axis 110 such that the open end of the slot 128 may be aligned with the protrusion 102. The cap 72 may then be moved along the axis 110 toward the fitting 70 so that the slot 128 receives the protrusion 102 and the protrusion 102 is disposed proximate the bend. Then the cap 72 may be rotated about the axis 110 such that the closed end of the slot 128 moves toward and is disposed proximate the protrusion 102, thereby limiting axial movement and removal of the cap 72. The protrusion 102 and the slot 128 may cooperate to set a rotational position of the cap 72 about the axis 110 in which the dipstick 78 may extend downward or toward a location where lubricant 48 collects inside the housing assembly 20 when the protrusion 102 is received in the slot 128. The cap 72 may be removed by rotating the cap 72 about the axis 110 so that the bend is disposed adjacent to the protrusion 102 and then the cap 72 may be moved along the axis 110 away from the fitting 70 to remove the cap 72. The cap 72 may then be maneuvered to allow the dipstick 78 to be removed from the fitting hole 94 to permit visual inspection of the level of lubricant proximate the free end of the dipstick 78.

Referring to FIGS. 3-5, the dipstick 78 may facilitate measurement of the level of the lubricant 48 in the housing assembly 20. The dipstick 78 may be configured as a thin rod, wire or other member that may be mounted to the cap 72 and that may be inserted through the fitting hole 94 of the fitting 70 to measure level of lubricant 48. The dipstick 78 may not engage the fitting 70 when the cap 72 is mounted to the fitting 70 and the dipstick 78 is disposed in the housing assembly 20 and the fitting hole 94. In at least one configuration, the dipstick 78 may have a nonlinear configuration that may allow the dipstick 78 to be located in close proximity to an inner side of the housing assembly 20. As such, the dipstick 78 may be installable in regions where there is limited space between the housing assembly 20 and internal components, such as the differential assembly 22. Moreover, the dipstick 78 may not contact moving components inside of the housing assembly like the differential assembly 22 and the axle shafts 24 when the cap 72 is mounted to the fitting 70. In at least one embodiment, the dipstick 78 may include a first end portion 130 and a second end portion 132. The dipstick 78 may also include a first intermediate portion 134 and a second intermediate portion 136.

The first end portion 130 may facilitate mounting of the dipstick 78 to the cap 72. For instance, the first end portion 130 may be mounted to or received in the mounting feature 120 of the cap 72. In at least one configuration, the first end portion 130 may be disposed along the axis 110.

The second end portion 132 may be disposed opposite the first end portion 130. As such, the second end portion 132 may be disposed at a distal end or a free end of the dipstick 78. The second end portion 132 may be at least partially receivable in the lubricant 48 that collects in the housing assembly 20. The second end portion 132 may also be configured to facilitate measurement of the amount of lubricant 48 or lubricant fill level in the housing assembly 20. For instance, the second end portion 132 may include one or more markings that may designate a maximum lubricant fill level, a minimum lubricant fill level, or both. Such markings may have any suitable configuration. For instance, a marking may be configured as a line, notch, groove, protrusion, or the like. In the configuration illustrated in FIG. 3, the maximum and minimum fill levels are designated with notches 140 that are provided along a vertically extending side of the dipstick 78; however, the notches may be omitted or supplemented with other markings, such as those depicted in the other dipstick configurations described below.

Referring primarily to FIGS. 4 and 5, the first intermediate portion 134 may extend from the first end portion 130. For instance, the first intermediate portion 134 may extend from the first end portion 130 in an axial direction to the second intermediate portion 136. The first intermediate portion 134 may be at least partially received in the fitting hole 94 when the cap 72 mounted to the fitting 70. In at least one configuration, the first intermediate portion 134 may include a first segment 150, a second segment 152, and a third segment 154.

The first segment 150 may extend from the first end portion 130 and may be received in the fitting hole 94 when the cap 72 is installed on the fitting 70. The first segment 150 may be disposed in a nonparallel and non-perpendicular relationship with the axis 110. For instance, the first segment 150 may extend at an angle from the first end portion 130 such that the first segment 150 extends in an upward direction and away from the axis 110.

The second segment 152 may extend from an end of the first segment 150 and may be received in the fitting hole 94 when the cap 72 is installed on the fitting 70. In at least one configuration, the second segment 152 may be offset from the axis 110 and may not intersect the axis 110. In addition, the second segment 152 may be disposed substantially parallel to the axis 110.

The third segment 154 may extend from an end of the second segment 152 to the second intermediate portion 136. At least a portion of the third segment 154 may not be received in the fitting hole 94 when the cap 72 is installed on the fitting 70. The third segment 154 may be disposed in a nonparallel and non-perpendicular relationship with the axis 110. For instance, the third segment 154 may extend at an angle from the second segment 152 such that the third segment 154 extends in a downward direction toward the axis 110.

The second intermediate portion 136 may extend from the first intermediate portion 134 to the second end portion 132. The second intermediate portion 136 may be disposed outside of the fitting hole 94 when the cap 72 is mounted to the fitting 70. In addition, the second intermediate portion 136 may be disposed substantially perpendicular to the axis 110. As such, the second intermediate portion 136 may extend vertically downward, which may facilitate the detection of the level of lubricant 48 in the sump portion 46.

The magnet 80 may be disposed proximate the second end 92 of the fitting 70. The magnet 80 or a portion thereof may be received in the housing assembly 20, fitting hole 94, or combinations thereof. In the configuration shown, the magnet 80 is partially received in the recess 104 of the fitting 70 and partially protrudes from the fitting 70 into the cavity 44. In at least one configuration, the magnet 80 may be configured as a ring that may extend around the axis 110 and that may define a magnet hole 160 through which the dipstick 78 may extend when the cap 72 is mounted to the fitting 70. The magnet 80 may attract and retain metal particulates that may be transported by the lubricant 48 when the lubricant 48 is splashed or otherwise moves in the housing assembly 20. As such, the magnet 80 may be inspected to determine if metal particulates are present, which may be indicative of wear of one or more components of the axle assembly 10. Inspection may include a visual inspection by looking through the fitting hole 94, a tactile inspection by touching the magnet 80, or combinations thereof.

The biasing member 82 may bias the cap 72 away from the fitting 70 and may inhibit unintentional rotation of the cap 72 about the axis 110, and hence inhibit unintentional disengagement of the protrusion 102 from the slot 128 and unintentional removal of the cap 72 from the fitting 70. The biasing member 82 may have any suitable configuration. For instance, the biasing member 82 may be configured as a spring, wave washer, or the like. In at least one configuration, the biasing member 82 may be received in the groove 122 of the cap 72.

The seal 84 may inhibit lubricant 48 from passing between the fitting 70 and the cap 72. The seal 84 may have any suitable configuration. For instance, the seal 84 may be configured as an O-ring that may be received in a seal groove in the inner ring 124 of the cap 72.

Figure 6:
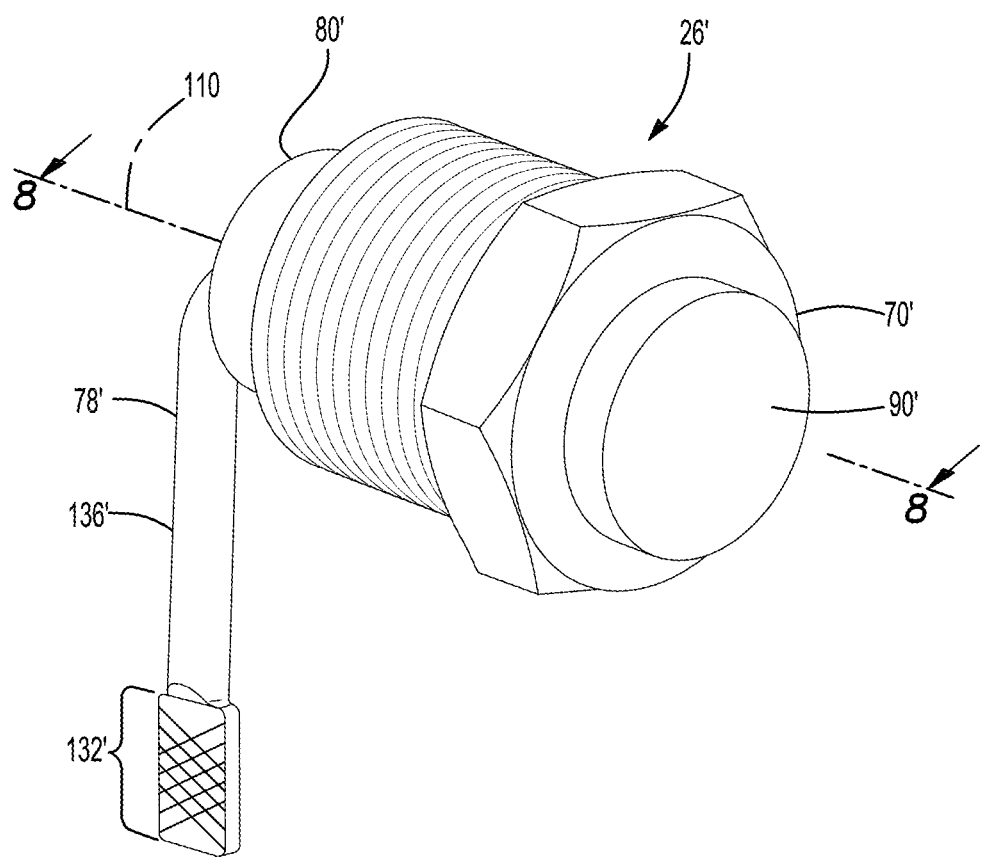
FIG. 6 is a perspective view of a second embodiment of a dipstick assembly that may be provided with the axle assembly.
Figure 7:
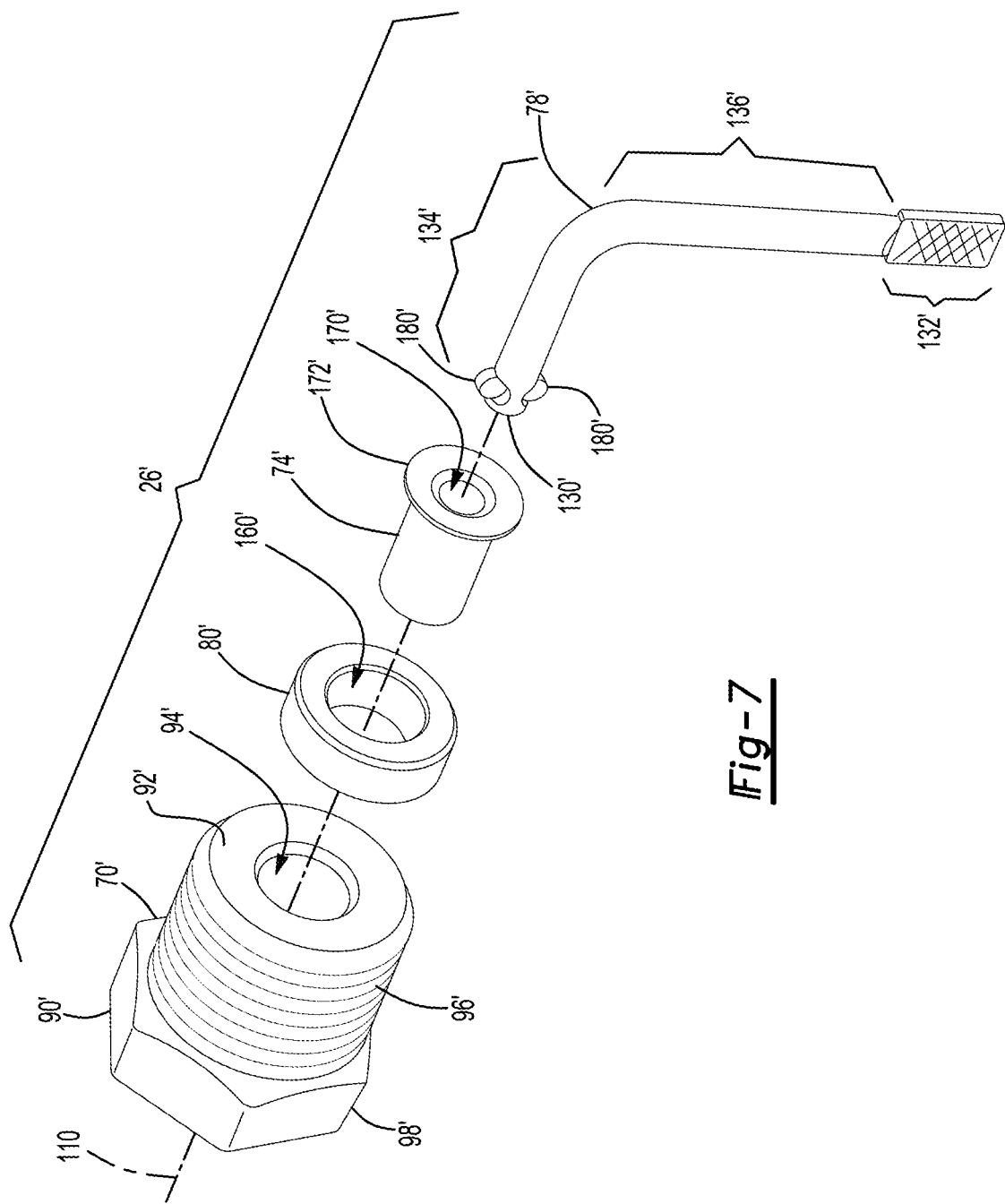
FIG. 7 is an exploded view of the dipstick assembly of FIG. 6.
Figure 8:
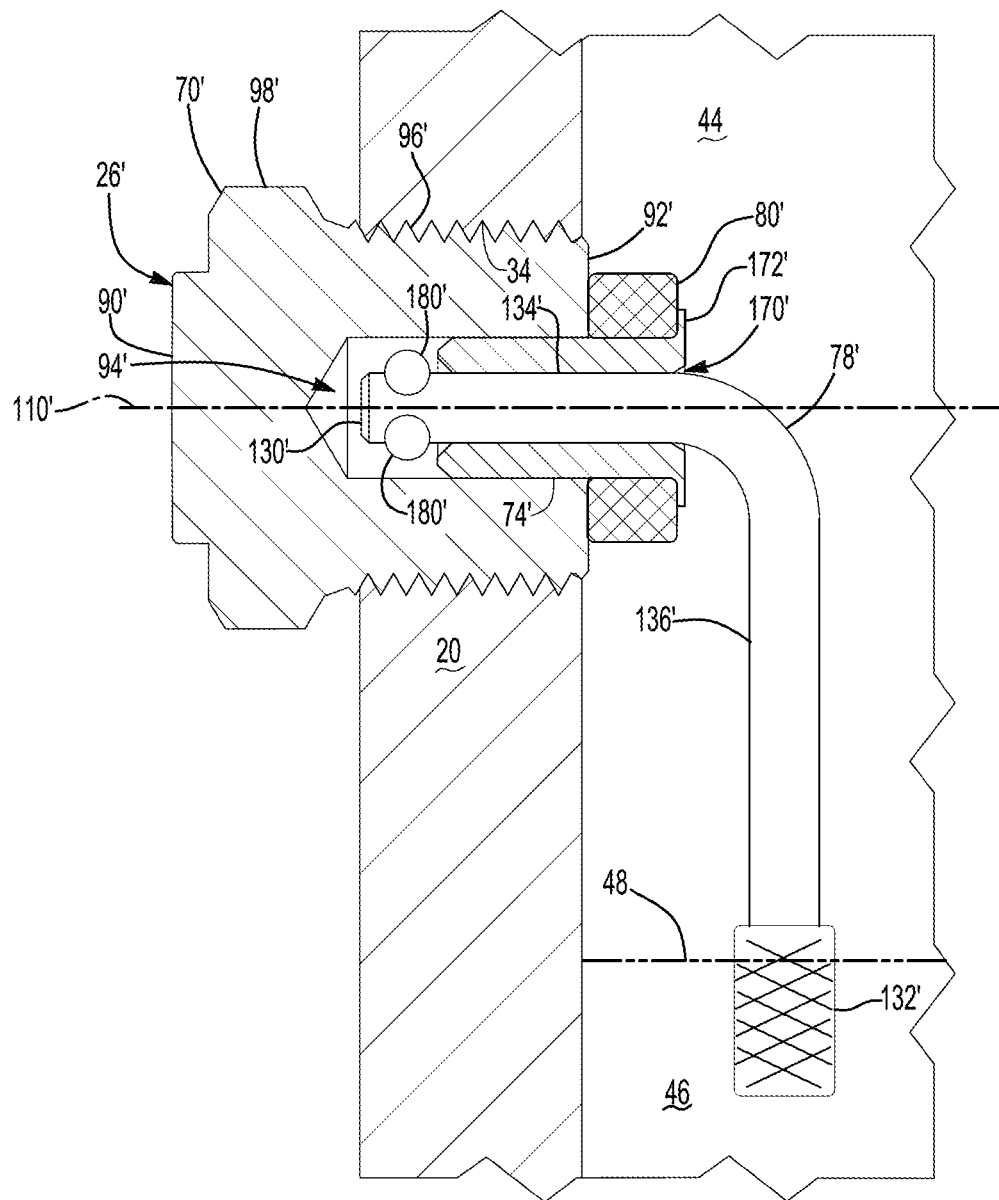
FIG. 8 is a section view along section line 8-8 of the dipstick assembly of FIG. 6 installed on the axle assembly.

Referring to FIGS. 6-8, a second configuration of a dipstick assembly 26' is shown. The dipstick assembly 26 may facilitate inspection of the level of lubricant 48 in a portion of the housing assembly 20, such as the sump portion 46, as previously discussed. In this configuration, the entire dipstick assembly 26' may be removably mounted to the housing assembly 20 rather than a portion of the dipstick assembly as in the dipstick assembly 26 previously described in which the fitting 70 remains mounted to the housing assembly 20. The dipstick assembly 26' may include a fitting 70', a sleeve 74', and a dipstick 78'. Optionally the dipstick assembly 26' may include a magnet 80'.

The fitting 70' may be removably mountable to the housing assembly 20. In at least one configuration, the fitting 70' may have a first end 90', a second end 92', a fitting hole 94', a mounting portion 96', and a tool engagement portion 98'.

The first end 90' may face away from the housing assembly 20. The first end 90' may also be disposed outside of the housing assembly 20.

Referring primarily to FIGS. 7 and 8, the second end 92' may be disposed opposite the first end 90'. The second end 92' may be disposed inside the housing assembly 20 or its mounting hole 34.

The fitting hole 94' may be defined by the fitting 70'. The fitting hole 94' may be a blind hole that may extend from the second end 92' toward the first end 90'. The fitting hole 94' may extend along the axis 110.

The mounting portion 96' may facilitate mounting of the fitting 70' to the housing assembly 20. In the configuration shown, the mounting portion 96' is threaded and is configured to mate with a corresponding thread in the mounting hole 34.

The tool engagement portion 98' may be axially positioned between the first end 90' and the second end 92'. For instance, the tool engagement portion 98' may be axially positioned between the first and 90' end the mounting portion 96'. The tool engagement portion 98' may be disposed outside of the housing assembly 20 and may include one or more flat surfaces that may be engageable with a tool, such as a socket or a wrench, to facilitate installation of the fitting 70' on the housing assembly 20.

The sleeve 74' may be fixedly mounted to the fitting 70'. For instance, the sleeve 74' may be partially received in the fitting hole 94' with an interference fit. In at least one configuration, the sleeve 74' may define a sleeve hole 170' and may have a sleeve flange 172'.

The sleeve hole 170' may be a through hole that may extend through the sleeve 74'. The dipstick 78' may extend through the sleeve hole 170'.

The sleeve flange 172' may be disposed at an end of the sleeve 74'. The sleeve flange 172' may extend away from the axis 110. The sleeve flange 172' may extend away from the axis 110 and may engage the magnet 80' to inhibit axial movement of the magnet 80'.

The dipstick 78' may facilitate measurement of the level of the lubricant 48 in the housing assembly 20. The dipstick 78' may be configured as a thin rod, wire, or other member that may be mounted to the fitting 70' in the fitting hole 94'. The dipstick 78' may not engage the fitting 70' in one or more embodiments. In at least one configuration, the dipstick 78' may have a nonlinear configuration that may allow the dipstick 78' to be located in close proximity to an inner side of the housing assembly 20. As such, the dipstick 78' may be installable in regions where there is limited space between the housing assembly 20 and internal components such as the differential assembly 22. Moreover, the dipstick 78' may not contact moving components inside of the housing assembly 20 like the differential assembly 22 and the axle shafts 24 when the fitting 70' is received in the mounting hole 34.

The dipstick 78' may be rotatably mounted to the fitting 70'. For instance, the dipstick 78' may be rotatable about the axis 110 independent of the fitting 70'. As such, the dipstick 78' may not rotate with the fitting 70' when the fitting 70' is rotated about the axis 110 to install or remove the fitting 70' from the mounting hole 34. Instead, the dipstick 78' may be free to rotate and may extend downward due to the force of gravity to a location where lubricant 48 may collect, such as the sump portion 46. As such, the dipstick 78' may be self-orienting in a manner that facilitates the detection of the level of lubricant 48. In at least one embodiment, the dipstick 78' may include a first end portion 130' and a second end portion 132'. The dipstick 78' may also include a first intermediate portion 134' and a second intermediate portion 136'.

The first end portion 130' may facilitate mounting of the dipstick 78' to the fitting 70'. For instance, the first end portion 130' may be rotatably received in the fitting hole 94'. In at least one configuration, the first end portion 130 may be disposed along the axis 110. The first end portion 130' may include a retaining feature 180'.

The retaining feature 180' may be received in the fitting hole 94' and may be spaced apart from the fitting 70'. The retaining feature 180' may inhibit removal of the dipstick 78' from the sleeve 74'. The retaining feature 180' may extend away from the axis 110 and may engage an end of the sleeve 74' that is located inside the fitting hole 94' to limit axial movement of the dipstick 78' toward the sleeve flange 172' and prevent removal of the dipstick 78' from the sleeve 74'.

The second end portion 132' may be disposed opposite the first end portion 130'. As such, the second end portion 132' may be disposed at a distal end or a free end of the dipstick 78'. The second end portion 132' may be at least partially receivable in the lubricant 48 that collects in the housing assembly 20. The second end portion 132' may also be configured to facilitate measurement of the amount of lubricant 48 or lubricant fill level in the housing assembly 20. For instance, the second end portion 132' may include one or more markings that may designate a maximum lubricant fill level, a minimum lubricant fill level, or both. Such markings may have any suitable configuration. For instance a marking may be configured as a line, notch, groove, protrusion, or the like as previously discussed.

Referring primarily to FIG. 8, the first intermediate portion 134' may extend from the first end portion 130' in an axial direction to the second intermediate portion 136'. The first intermediate portion 134' may be at least partially received in the fitting hole 94' and the sleeve hole 170' and may extend along the axis 110.

The second intermediate portion 136' may extend from the first intermediate portion 134' to the second end portion 132'. The second intermediate portion 136' may be disposed outside of the fitting hole 94' when the fitting 70' is mounted to the housing assembly 20. In addition, the second intermediate portion 136' may be disposed substantially perpendicular to the axis 110. As such, the second intermediate portion 136' may extend vertically downward, which may facilitate the detection of the level of lubricant 48 in the sump portion 46.

The magnet 80' may be disposed proximate the second end 92' of the fitting 70'. The magnet 80' or a portion thereof may be received in the housing assembly 20. In the configuration shown, the magnet 80' engages the second end 92' of the fitting 70' and is received in the cavity 44. In at least one configuration, the magnet 80' may be configured as a ring that may extend around the axis 110 and that may define a magnet hole 160' through which the sleeve 74' and the dipstick 78' may extend. The magnet 80' may attract and retain metal particulates and may be inspected as previously described.

The dipstick assembly 26' may be removed from the housing assembly 20 by rotating the fitting 70' about the axis 110 in a first rotational direction. Once the fitting 70' has been released from the housing assembly 20, the fitting 70' and dipstick 78' may then be maneuvered to remove the dipstick 78' through the mounting hole 34. The dipstick 78' may then be inspected to determine the level of lubricant 48 as previously discussed. The dipstick assembly 26' may then be reinstalled by inserting the dipstick 78' through the mounting hole 34, engaging the mounting portion 96' with the thread of the mounting hole 34, and rotating the fitting 70' in a second rotational direction to secure the fitting 70' to the housing assembly 20.

Figure 9:
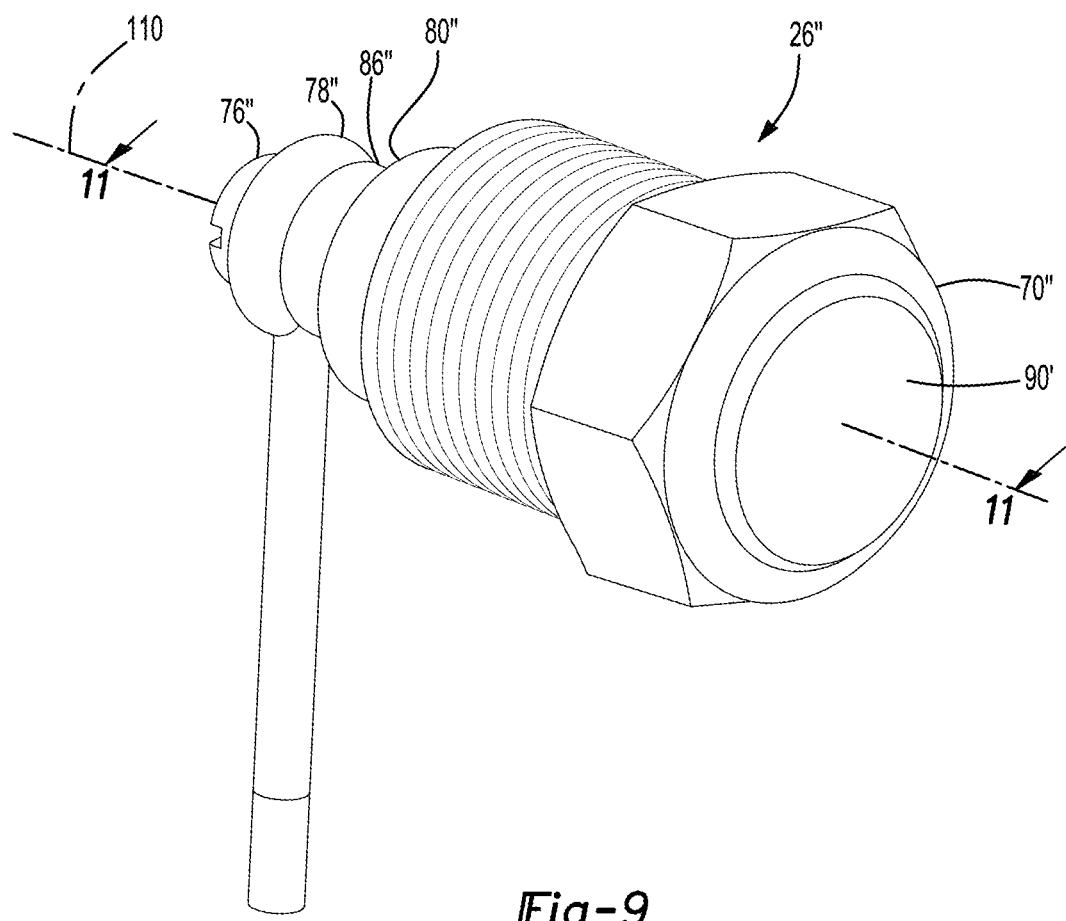
FIG. 9 is a perspective view of a third embodiment of a dipstick assembly that may be provided with the axle assembly.
Figure 10:
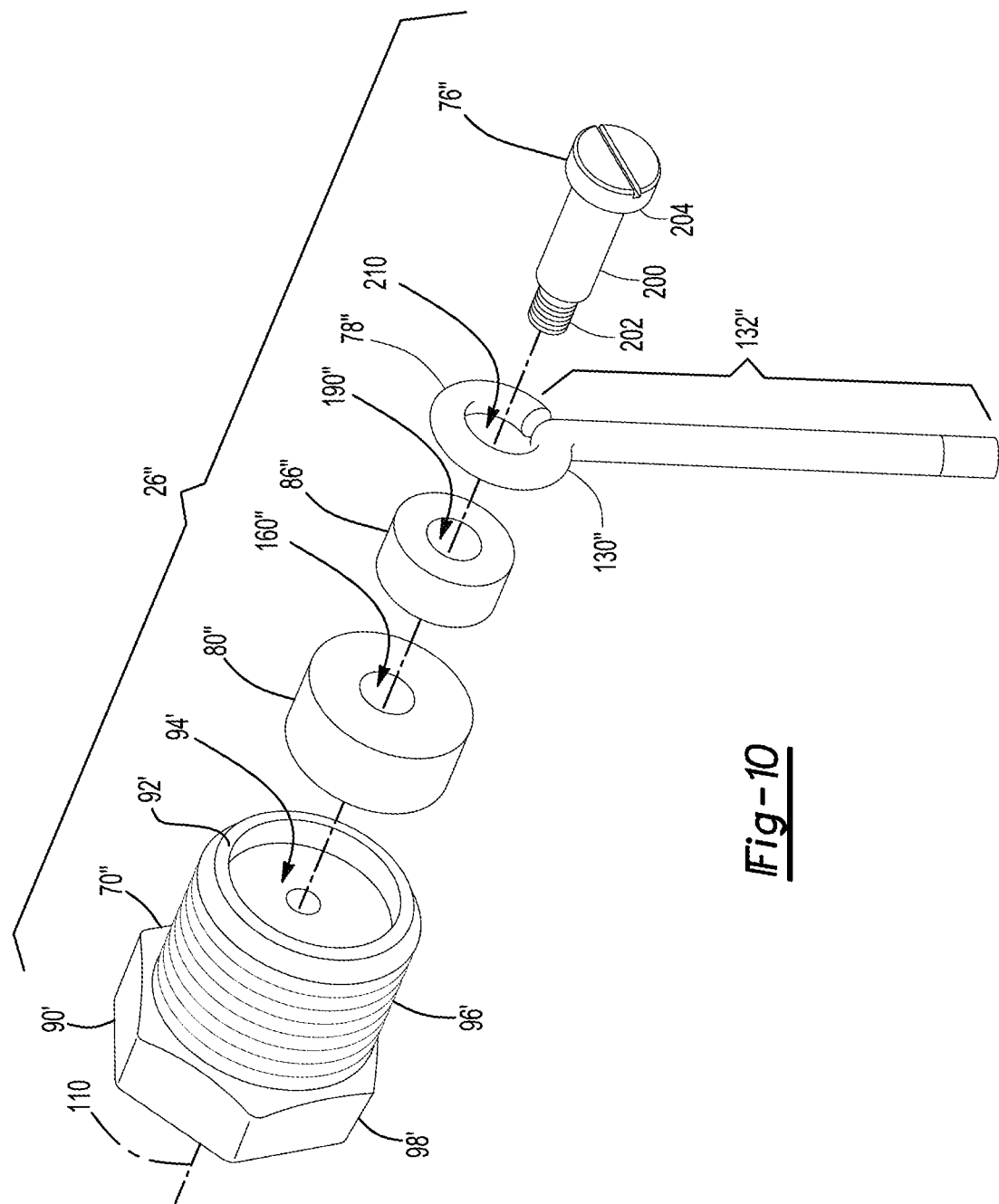
FIG. 10 is an exploded view of the dipstick assembly of FIG. 9.
Figure 11:
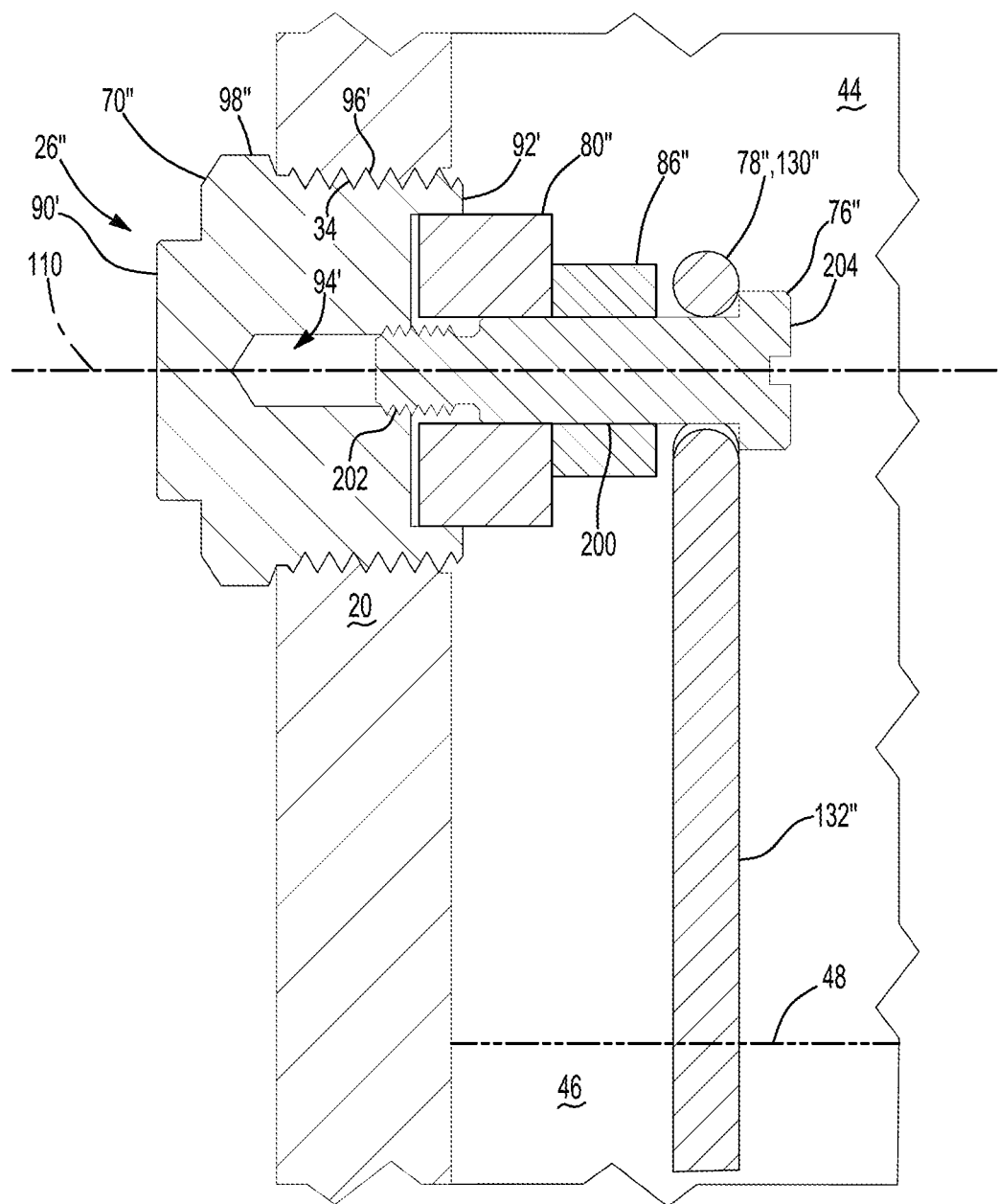
FIG. 11 is a section view along section line 11-11 of the dipstick assembly of FIG. 9 installed on the axle assembly.

Referring to FIGS. 9-11, a third configuration of a dipstick assembly 26" is shown. In this configuration, the entire dipstick assembly 26" may be removably mountable to the housing assembly 20 like the dipstick assembly 26' previously described. The dipstick assembly 26" may include a fitting 70", a fastener 76", and a dipstick 78". Optionally, the dipstick assembly 26" may also include a magnet 80", a spacer 86", or both.

Referring primarily to FIGS. 10 and 11, the fitting 70'" may be removably mountable to the housing assembly 20 and may be similar to the fitting 70' previously described. For example, the fitting 70'" may have a first end 90', a second end 92', a fitting hole 94', a mounting portion 96', and a tool engagement portion 98'. The fitting hole 94' may be a blind hole that may extend along the axis 110 from the second end 92' toward the first end 90' as previously described. The fitting hole 94' may be threaded.

The fastener 76" may extend along the axis 110. The fastener 76" may be fixedly coupled to the fitting 70'" such that the fastener 76" may not rotate with respect to the fitting 70'". The fastener 76" may be partially received in the fitting hole 94' and may have any suitable configuration. In at least one configuration, the fastener 76" may have a shank 200, a threaded portion 202, and an enlarged head 204.

The shank 200 may be disposed along the axis 110. The shank 200 may have any suitable configuration. For instance the shank 200 may have a cylindrical configuration that may be centered about the axis 110. The shank 200 may have a larger diameter than the threaded portion 202.

The threaded portion 202 may extend from the shank 200. The threaded portion 202 may be received in the fitting hole 94' and may mate with the thread of the fitting hole 94'.

The enlarged head 204 may extend from the shank 200 and may be disposed at an end of the shank 200 opposite the threaded portion 202. The enlarged head 204 may have a larger diameter than the shank 200 to limit axial movement of the dipstick 78".

The dipstick 78" may facilitate measurement of the level of lubricant 48 in the housing assembly 20 as previously described. The dipstick 78" may be spaced apart from and may not contact the fitting 70", the magnet 80", or moving components inside of the housing assembly 20, such as the differential assembly 22 and the axle shafts 24, when the fitting 70" is received in the mounting hole 34.

The dipstick 78" may be rotatably mounted to the fitting 70" such that the dipstick 78" is rotatable about the axis 110 independent of the fitting 70". As such, the dipstick 78" may not rotate with the fitting 70" when the fitting 70" is rotated about the axis 110 to install or remove the fitting 70" from the mounting hole 34. Instead, the dipstick 78" may be free to rotate and may extend downward under the force of gravity to a location where lubricant 48 may collect, such as the sump portion 46. As such, the dipstick 78" may be self-orienting in a manner that facilitates the detection of the level of lubricant 48. In the configuration shown, the dipstick 78" has a cylindrical cross-section although other cross-sectional shapes are contemplated. In at least one embodiment, the dipstick 78" may include a first end portion 130" and a second end portion 132".

The first end portion 130" may facilitate mounting of the dipstick 78" to the fastener 76". For instance, the first end portion 130" may define a dipstick hole 210 through which the fastener 76" may extend. As such, the first end portion 130" of the dipstick 78" may extend at least partially around the shank 200 of the fastener 76". The dipstick hole 210 may be slightly larger than the shank 200 to permit the dipstick 78" to rotate about the shank 200. The dipstick hole 210 may extend partially or completely around the fastener 76". For instance, the dipstick hole 210 may extend partially around the fastener 76" by forming the dipstick 78" around a die or mandrel such that the dipstick 78" does not extend continuously around the axis 110.

The second end portion 132" may extend from the first end portion 130" and may include a distal end or a free end of the dipstick 78". The second end portion 132" may be at least partially receivable in the lubricant 48 that collects in the housing assembly 20. The second end portion 132" may also be configured to facilitate measurement of the amount of lubricant 48 or lubricant fill level in the housing assembly 20. For instance, the second end portion 132" may include one or more markings that may designate a maximum lubricant fill level, a minimum lubricant fill level, or both. Such markings may have any suitable configuration as previously described.

The magnet 80" may be disposed on the fitting 70". The magnet 80" may extend around the axis 110 and may define a magnet hole 160". The magnet 80" may be disposed proximate the second end 92' of the fitting 70". The magnet 80" or a portion thereof may be received in the housing assembly 20. In the configuration shown, the magnet 80" engages the second end 92" of the fitting 70" and is partially received in the cavity 44. In at least one configuration, the magnet 80" may be configured as a ring that may extend around the axis 110 and that may define a magnet hole 160" through which the fastener 76" may extend. The dipstick 78" may not extend through the magnet hole 160". The magnet 80" may attract and retain metal particulates and may be inspected as previously described. The magnet 80" may be attached to the fitting 70" in any suitable manner, such as with an adhesive, fastener, magnetically, or combinations thereof.

The spacer 86", if provided, may be axially positioned between the dipstick 78" and the magnet 80". The spacer 86" may have a spacer hole 190" through which the fastener 76" may extend. As such, the spacer 86" may separate the dipstick 78" from the magnet 80". Such separation may help maintain rotatability of a dipstick 78", such as when the dipstick 78" is made of a ferrous material. For example, the spacer 86" may separate the dipstick 78" from the magnet 80" so that the dipstick 78" may not be directly or indirectly magnetically attached to the magnet 80" in a manner that prevents rotation of the dipstick 78" about the axis 110.

Figure 12:
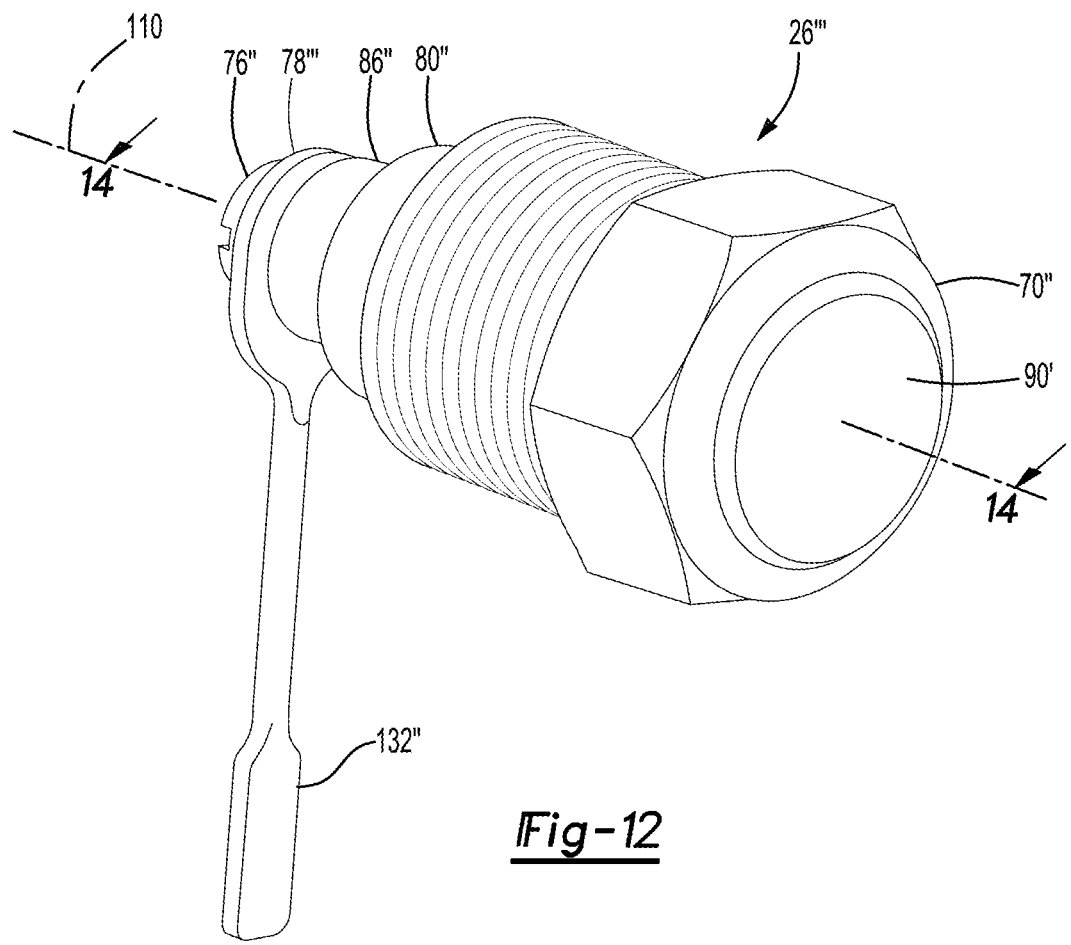
FIG. 12 is a perspective view of a fourth embodiment of a dipstick assembly that may be provided with the axle assembly.
Figure 13:
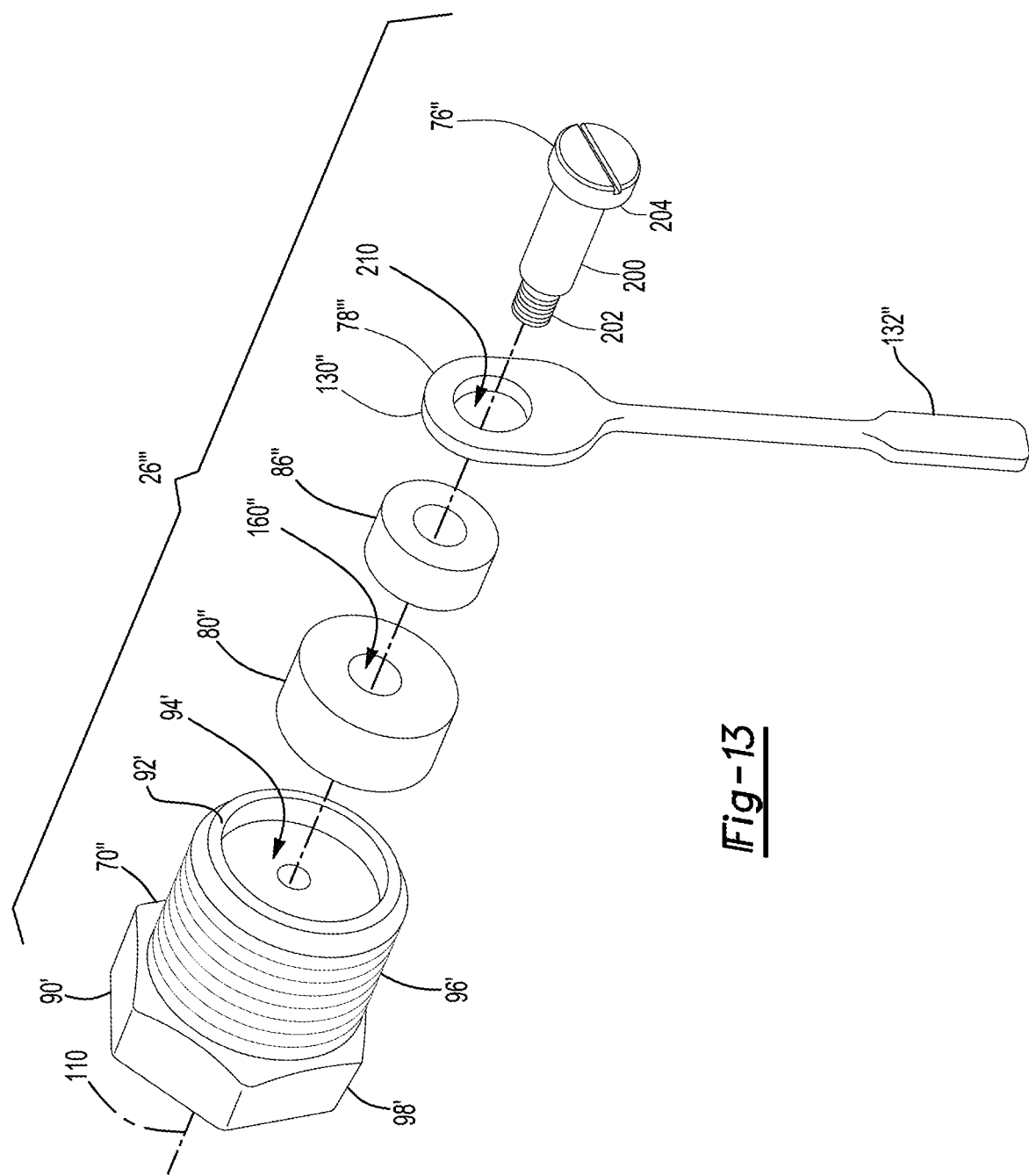
FIG. 13 is an exploded view of the dipstick assembly of FIG. 12.
Figure 14:
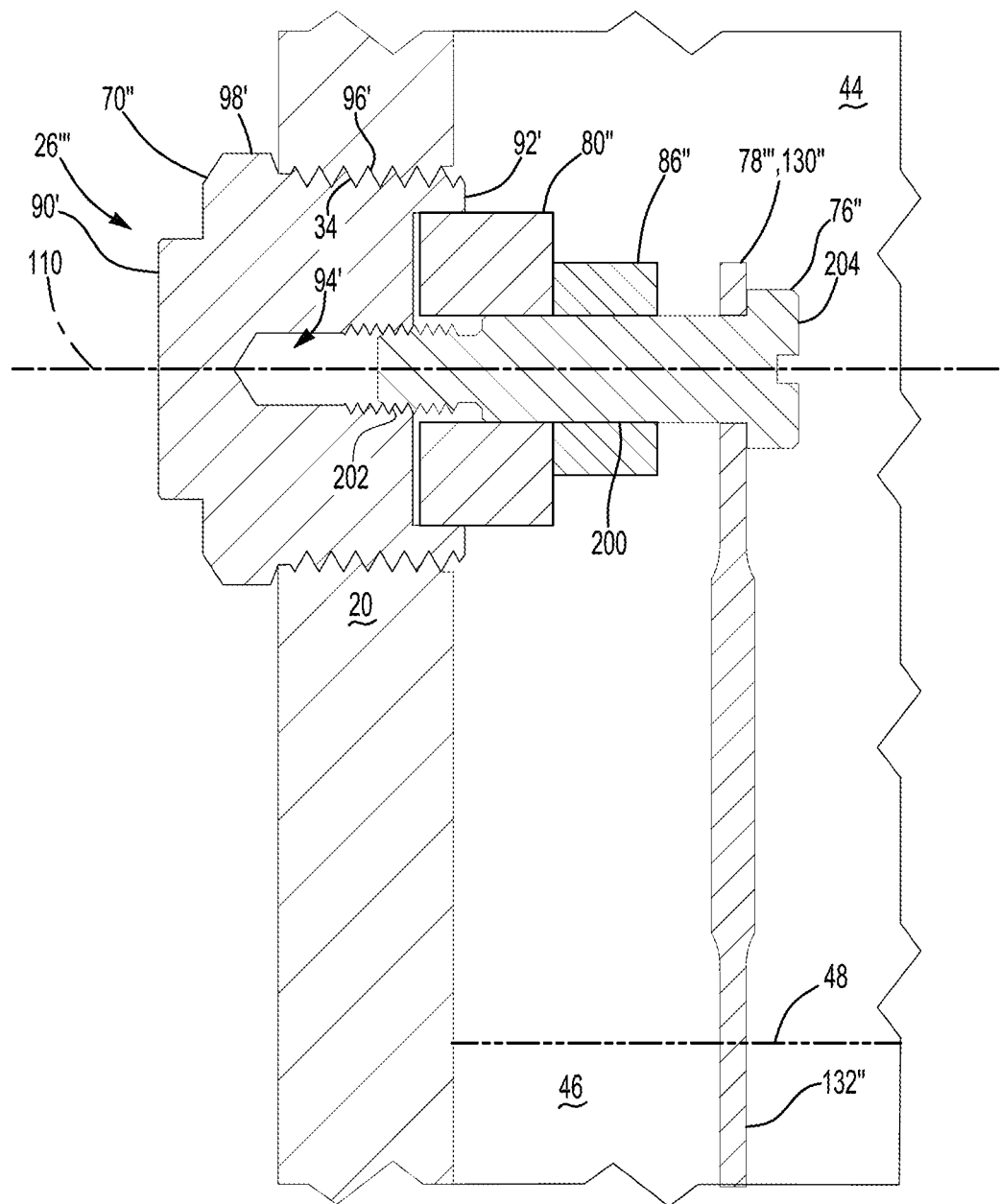
FIG. 14 is a section view along section line 14-14 of the dipstick assembly of FIG. 12 installed on the axle assembly.

Referring to FIGS. 12-14, another configuration of a dipstick assembly 26''' is shown. This configuration may be substantially the same as the configuration shown in FIGS. 9-11 except for the configuration of the dipstick 78". In this configuration, the dipstick 78''' defines a dipstick hole 210 that extends continuously around the fastener 76" rather than partially around the fastener 76". In addition, the dipstick 78''' or a portion thereof may have a non-cylindrical cross-section. For instance, the dipstick 78" may be a stamped part in which the first end portion 130" and the second end portion 132" have generally flat or planar opposing surfaces. The portion of the dipstick 78''' that interconnects the first end portion 130" and the second end portion 132" may also be flattened or may have a different cross-sectional shape.

The axle assembly and dipstick assemblies described above may allow the level of lubricant within an axle housing to be more accurately assessed as compared to other techniques in which a predetermined amount of lubricant is added but not subsequently measured (e.g., the lubricant level is subjectively evaluated rather than quantitatively measured). A more accurate assessment of the lubricant level in an axle housing may allow an axle assembly to be specified with or filled to a lower lubricant fill level, which may reduce lubricant drag or churning losses when the differential assembly rotates, may increase operating efficiency of the axle assembly, and may reduce vehicle fuel consumption. The dipstick assembly may allow the lubricant level to be checked without specialized tools. In addition, more accurate assessment of lubricant levels may avoid under filling an axle assembly with lubricant, which may not only help ensure that an appropriate amount of lubricant is inside the axle assembly, but may also help reduce warranty costs incurred by vehicle manufacturers due to a vehicle dealer subjectively and incorrectly determining that an axle assembly was underfilled during a pre-sale inspection and then unnecessarily adding lubricant to the axle assembly and charging the associated labor and materials to the vehicle manufacturer.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An axle assembly comprising:
    a housing assembly that at least partially defines a cavity that receives a lubricant, the housing assembly having a mounting hole; and
    a dipstick assembly that is removably mountable to the housing assembly, the dipstick assembly including:
        a fitting that is removably mountable to the housing assembly and is receivable in the mounting hole, the fitting being disposed along an axis and defining a fitting hole that is disposed along the axis,
        a dipstick that is rotatably mounted to the fitting such that the dipstick is rotatable about the axis independent of the fitting;
        a magnet that extends around the axis and defines a magnet hole; and
        a sleeve that is partially received in the fitting hole, wherein the sleeve defines a sleeve hole through which the dipstick extends and has a sleeve flange that extends away from the axis and that engages the magnet to inhibit axial movement of the magnet.

2. The axle assembly of claim 1 wherein the magnet is disposed on the fitting and defines the magnet hole through which the dipstick extends.

3. The axle assembly of claim 1, wherein the dipstick is rotatably received in the fitting hole.

4. The axle assembly of claim 1 wherein the dipstick includes a retaining feature that is received in the fitting hole and that inhibits removal of the dipstick from the sleeve.

5. The axle assembly of claim 4 wherein the retaining feature is axially positioned between the fitting and the sleeve.

6. The axle assembly of claim 4 wherein the retaining feature extends away from the axis and engages an end of the sleeve to limit axial movement of the dipstick.

7. The axle assembly of claim 1 wherein the sleeve is received in the magnet hole.

8. The axle assembly of claim 1 wherein the dipstick is spaced apart from the fitting.

9. The axle assembly of claim 1 wherein the dipstick is L-shaped and has a first intermediate portion that extends along the axis and a second intermediate portion that extends from an end of the first intermediate portion in a direction that extends away from the axis.

10. The axle assembly of claim 9 wherein the first intermediate portion is received inside the fitting.

11. The axle assembly of claim 1 wherein the magnet extends from the sleeve flange to a second end of the fitting.

12. The axle assembly of claim 1 wherein the dipstick is spaced apart from and does not contact the magnet.

13. The axle assembly of claim 1 wherein the fitting has a threaded mounting portion that contacts the housing assembly and the fitting contacts the sleeve when the dipstick assembly is mounted to the housing assembly.

14. The axle assembly of claim 1 wherein the fitting hole is a blind hole.

15. The axle assembly of claim 1 wherein the fitting has a threaded mounting portion that contacts the housing assembly, the fitting contacts the sleeve, and the fitting hole is a blind hole.

16. The axle assembly of claim 1 wherein the fitting has a threaded mounting portion, the fitting hole is a blind hole, and the sleeve contacts and is fixed to the fitting in the fitting hole.

17. The axle assembly of claim 1 wherein the fitting has a threaded mounting portion, the fitting hole is a blind hole, the sleeve contacts and is fixed to the fitting in the fitting hole, and the dipstick extends through the sleeve and contacts the sleeve.

18. The axle assembly of claim 1 wherein the fitting contacts the housing assembly in the mounting hole when the dipstick assembly is mounted to the housing assembly and the fitting encircles and contacts the sleeve.

19. The axle assembly of claim 1 wherein the fitting contacts the housing assembly in the mounting hole and the fitting and the magnet encircle and contact the sleeve when the dipstick assembly is mounted to the housing assembly.

* * * * *